(12) United States Patent
Villette et al.

(10) Patent No.: US 12,445,030 B2
(45) Date of Patent: Oct. 14, 2025

(54) MAGNETO-HYDRODYNAMIC (MHD) CONNECTION PUMP AND A DOWNHOLE TUBING CONNECTION SYSTEM USING THE SAME

(71) Applicant: SAUDI ARABIAN OIL COMPANY, Dhahran (SA)

(72) Inventors: Thibault Villette, Belfort (FR); Abderrazak Traidia, Lussan (FR); Abdullah Alshahrani, Dammam (SA); Ali Abdulrazaq Hijles, Dhahran (SA); Anwar Parvez, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 81 days.

(21) Appl. No.: 18/539,497

(22) Filed: Dec. 14, 2023

(65) Prior Publication Data
US 2025/0202331 A1    Jun. 19, 2025

(51) Int. Cl.
*H02K 44/04* (2006.01)
*E21B 43/12* (2006.01)

(52) U.S. Cl.
CPC ........... *H02K 44/04* (2013.01); *E21B 43/128* (2013.01)

(58) Field of Classification Search
CPC .............................. E21B 43/128; H02K 44/04
USPC .......................................................... 417/50
See application file for complete search history.

(56) References Cited

U.S. PATENT DOCUMENTS

| | | | |
|---|---|---|---|
| 4,151,423 A * | 4/1979 | Hendel | F03B 13/12 |
| | | | 290/43 |
| 5,589,297 A * | 12/1996 | Koga | H01M 4/668 |
| | | | 429/212 |
| 6,029,453 A | 2/2000 | Mendive | |
| 6,146,103 A | 11/2000 | Lee et al. | |
| 7,753,656 B2 | 7/2010 | Lemoff et al. | |
| 8,336,611 B2 | 12/2012 | Ouyang | |
| 8,632,318 B2 | 1/2014 | Jennings | |
| 8,684,701 B2 * | 4/2014 | Jennings | E21B 21/08 |
| | | | 417/50 |
| 9,554,487 B2 | 1/2017 | Glew et al. | |

(Continued)

FOREIGN PATENT DOCUMENTS

| | | | |
|---|---|---|---|
| DE | 102004044539 A1 * | 3/2006 | ............. B22D 35/00 |
| KR | 20180106183 A | 10/2018 | |
| NO | 340290 B1 | 3/2017 | |

OTHER PUBLICATIONS

International Search Report issued for corresponding international patent application No. PCT/US2024/060098, mailed Mar. 19, 2025 (6 pages).

(Continued)

*Primary Examiner* — Kenneth J Hansen
(74) *Attorney, Agent, or Firm* — Osha Bergman Watanabe & Burton LLP

(57) ABSTRACT

Various embodiments of magneto-hydrodynamic connection pumps are discussed. In some cases, the pumps include: a body forming an inner channel, a first connection part on a first side of the tube, a second connection part on a second side of the tube; an anode electrode on an inside wall of the body, a cathode electrode located on the inside wall of the body at a location opposite the anode electrode, and one or more permanent magnets attached to or embedded into an outside wall of the body.

18 Claims, 7 Drawing Sheets

(56) References Cited

U.S. PATENT DOCUMENTS

2022/0190410 A1\* 6/2022 Linde ..................... B32B 3/08
2023/0053504 A1 2/2023 McGuire

OTHER PUBLICATIONS

Written Opinion issued for corresponding international patent application No. PCT/US2024/060098, mailed Mar. 19, 2025 (7 pages).

\* cited by examiner

MAGNETO-HYDRODYNAMIC (MHD) CONNECTION PUMP AND A DOWNHOLE TUBING CONNECTION SYSTEM USING THE SAME

TECHNICAL FIELD

This application relates to submersible pumps, and more particularly to submersible pumps utilized in the oil and gas industry.

BACKGROUND

There are three types of submersible pump systems utilized in the oil and gas industry: an electrical submersible pump (ESP) system, a line shaft pump (LSP) system, and a turbine pump (TP) system. The submersible pump system most commonly employed in downhole operations is the ESP system. The electrical connectivity of the ESP systems is complex and bulky.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a magneto-hydrodynamic (MHD) connection pump. The pump includes: a body forming an inner channel, a first connection part on a first side of the tube, a second connection part on a second side of the tube; an anode electrode on an inside wall of the body, a cathode electrode located on the inside wall of the body at a location opposite the anode electrode, and one or more permanent magnets attached to or embedded into an outside wall of the body.

In general, in another aspect, embodiments relate to a downhole tubing connection system. The system includes at least a first MHD connection pump and a second MHD connection pump. Each of the first MHD connection pump and the second MHD connection pump includes: a body forming an inner channel, a first connection part on a first side of the tube, a second connection part on a second side of the tube; an anode electrode on an inside wall of the body, a cathode electrode located on the inside wall of the body at a location opposite the anode electrode, and one or more permanent magnets attached to or embedded into an outside wall of the body.

Other aspects of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In some instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a circuit breaker" includes reference to one or more of such circuit breakers.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although multiple dependent claims are not introduced, it would be apparent to one of ordinary skill that the subject matter of the dependent claims of one or more embodiments may be combined with other dependent claims.

Figure 1A:
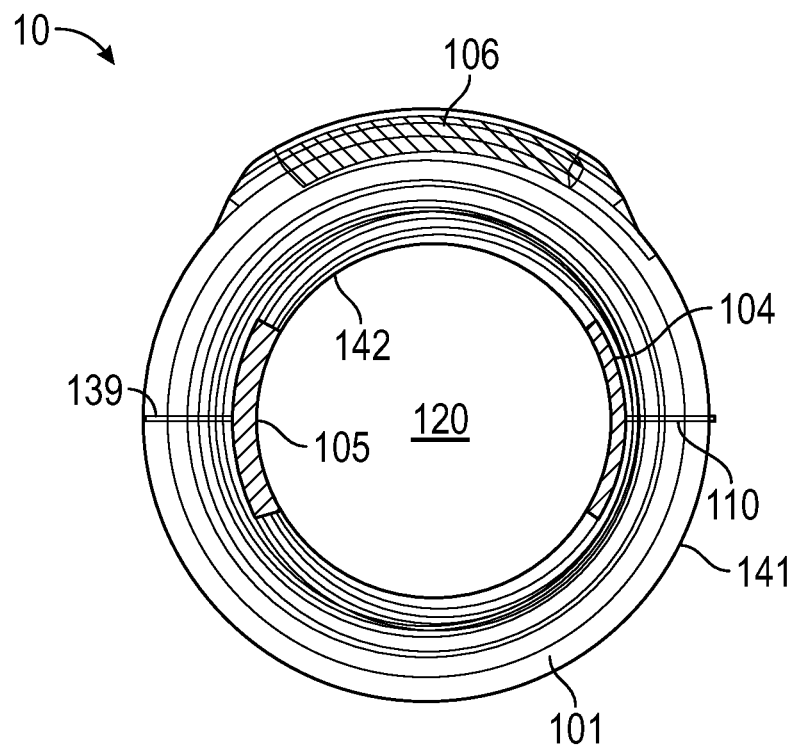
FIGS. 1A-1E are schematic diagrams of different views of an integrated magneto-hydrodynamic (MHD) connection pump in accordance with some embodiments.

FIGS. 1A-1E show different views of an integrated magneto-hydrodynamic (MHD) connection pump 10 in accordance with some embodiments. Turning to FIG. 1A, a cross-sectional view of MHD connection pump 10 is shown. As shown, MHD connection pump 10 includes a body 101 in a tubular shape. Body 101 forms an inner channel 120 and has an outside wall 141 and an inside wall 142. In some cases, an electrically conductive liquid medium (i.e., a conductive fluid) flows through inner channel 120.

Figure 1B:
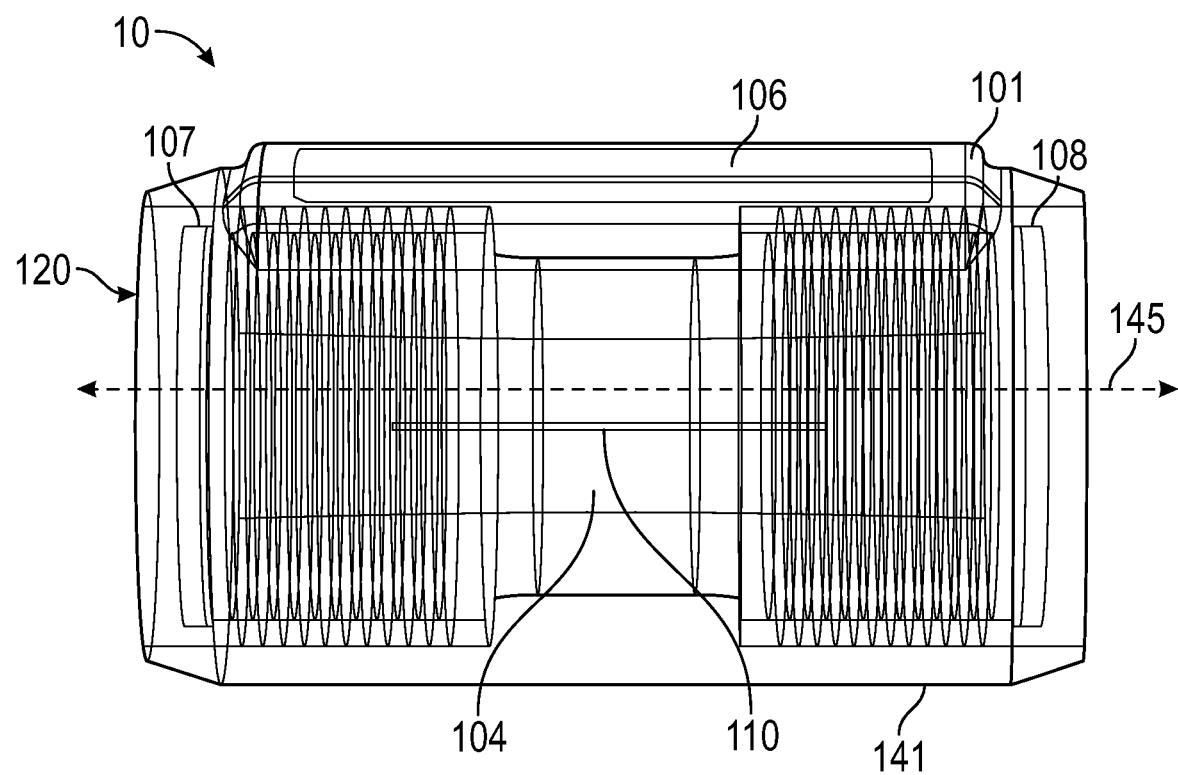

Turning to FIG. 1B, a first side view of MHD connection pump 10 is shown. As shown, an external electric cable 110 on outside wall 141 is electrically connected to an anode electrode 104 within inner channel 120. A permanent magnet 106 is either attached to outside wall 141 or is embedded or otherwise integrated into outside wall 141. While shown as a single permanent magnet, permanent magnet 106 may include one or more permanent magnets. These one or more permanent magnets may be arranged relative to one another as well as anode electrode 104 and cathode electrode 105 as more fully described below in relation to FIGS. 3 and 4A-4E. An axis direction 145 shown as a dashed line extending along body 101.

In some embodiments, permanent magnet 106 includes solid rows of permanent magnets. In various embodiments, permanent magnet 106 is firmly attached to the body of the body 101 to avoid any potential motion of the permanent magnet 106. This can be achieved by fixing the magnet to outside wall 141 of body 101 using, for example, an epoxy adhesive. In one or more embodiments, permanent magnet 106 is embedded into body 101 during the manufacture of body 101. In some embodiments, outside wall 141 of body 101 includes a recess along axis direction 145. In such embodiments, permanent magnet 106 may be sized to fit within the recess.

Figure 1C:
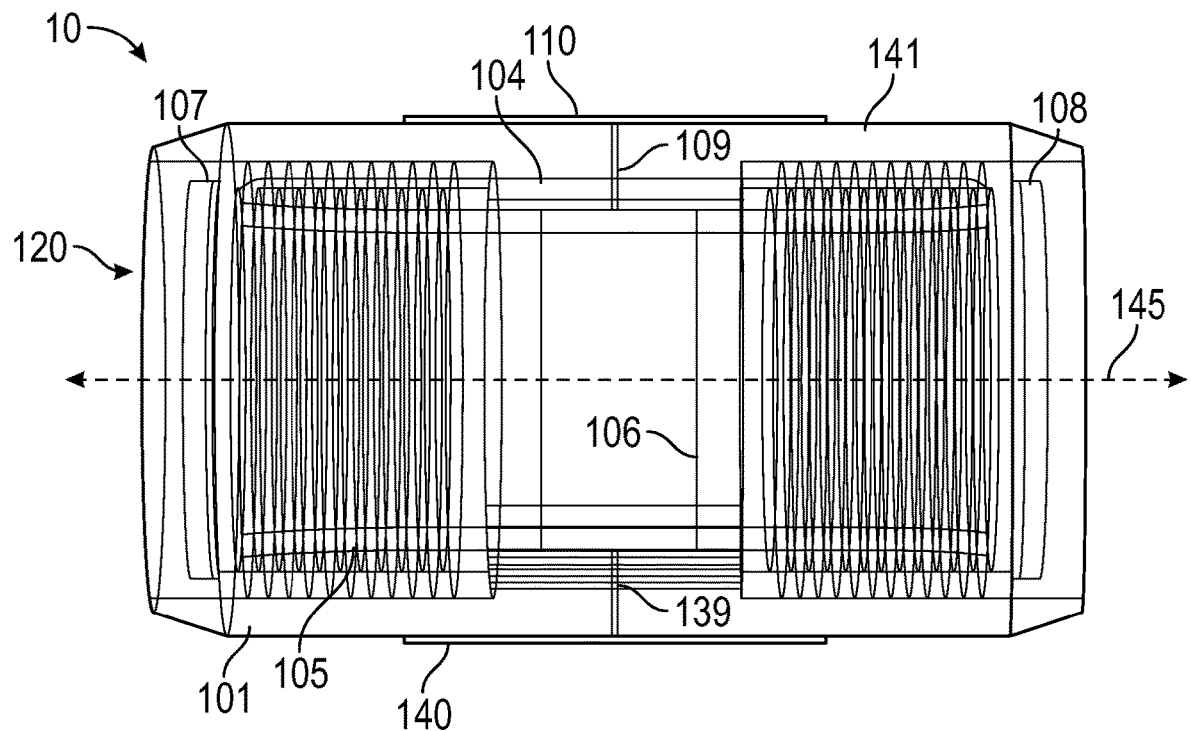

Turning to FIG. 1C, a second side view of MHD connection pump 10 is shown, where the second side view shows body 101 rotated ninety degrees upward from that shown in the first side view of FIG. 1A. As shown, external electric cable 110 is electrically coupled to anode electrode 104 via a first conductive element 109 extending from outside wall 141 to inside wall 142. An external electric cable 140 on outside wall 141 is electrically connected to a cathode electrode 105 via a second conductive element 139. Cathode electrode 105 is at a location opposite that of anode electrode 104. In some embodiments, conductive element 109 and conductive element 139 are each electrically conductive wires inserted during the manufacturing process of body 101. Such electrically conductive wires may be, but are not limited to, a copper wire or several carbon fiber tows inserted during the manufacturing process of the body 101. Based upon the disclosure provided herein, one of ordinary skill in the art will recognize a variety of electrically conductive materials and/or manufacturing processes that may be used in relation to different embodiments.

Figure 1D:
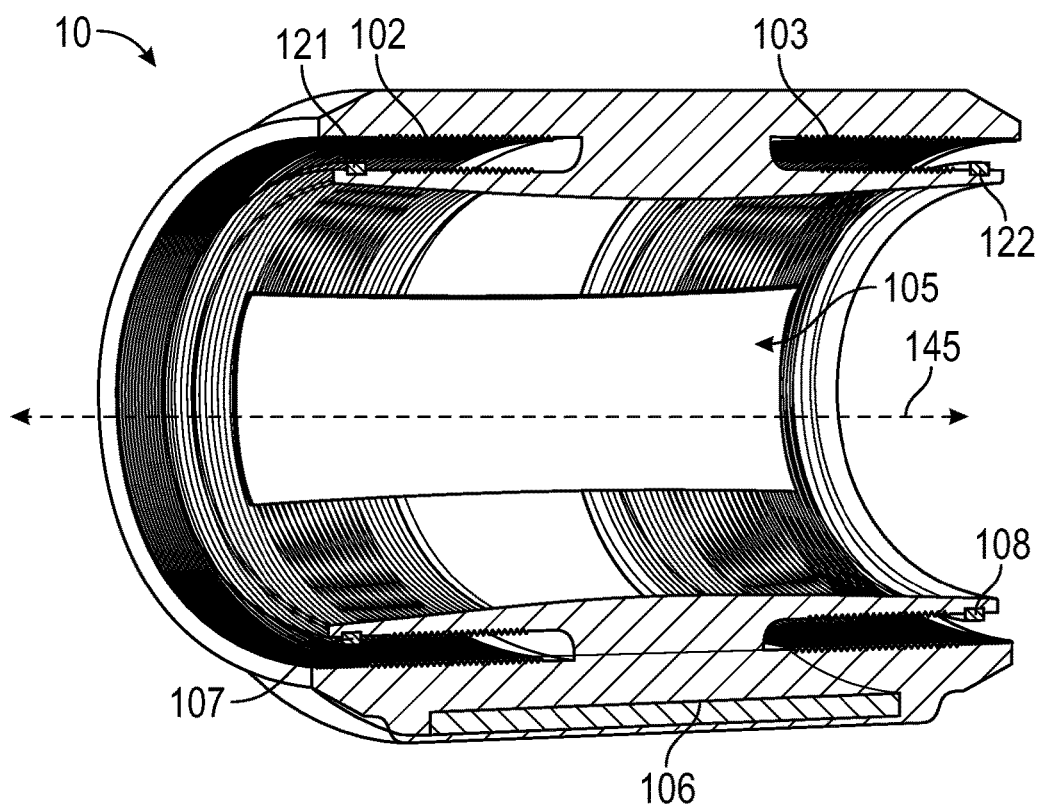

Turning to FIG. 1D, a first cut-away view of MHD connection pump 10 is shown. As shown, a first connection part 102 is associated with a first side of MHD connection pump 10, and a second connection part 103 is associated with a second side of MHD connection pump 10. A first o-ring 107 is disposed between first connection part 102 and a groove 121. A second o-ring 108 is disposed between second connection part 103 and a groove 122. First o-ring 107 and second o-ring 108 may be, but are not limited to, elastomeric and metallic o-rings used to protect from corrosive fluids moving through body 101. First groove 121 and second groove 122 each exhibit a circular cross-section and are arranged along axis direction 145 of body 101. First connection part 102 is connected to the first groove 121, for example, by threads. First connection part 102 may be a rigid outward tube which can fit with second groove 122 of another connection pump (not shown). Second connection part 103 may be manufactured by forming threads in second groove 122. First connection part 102 and second connection part 103 may be threaded connections. Such threaded connections may be configured to match threading of one or more components to which MHD connection pump 10 is expected to be connected.

Figure 1E:
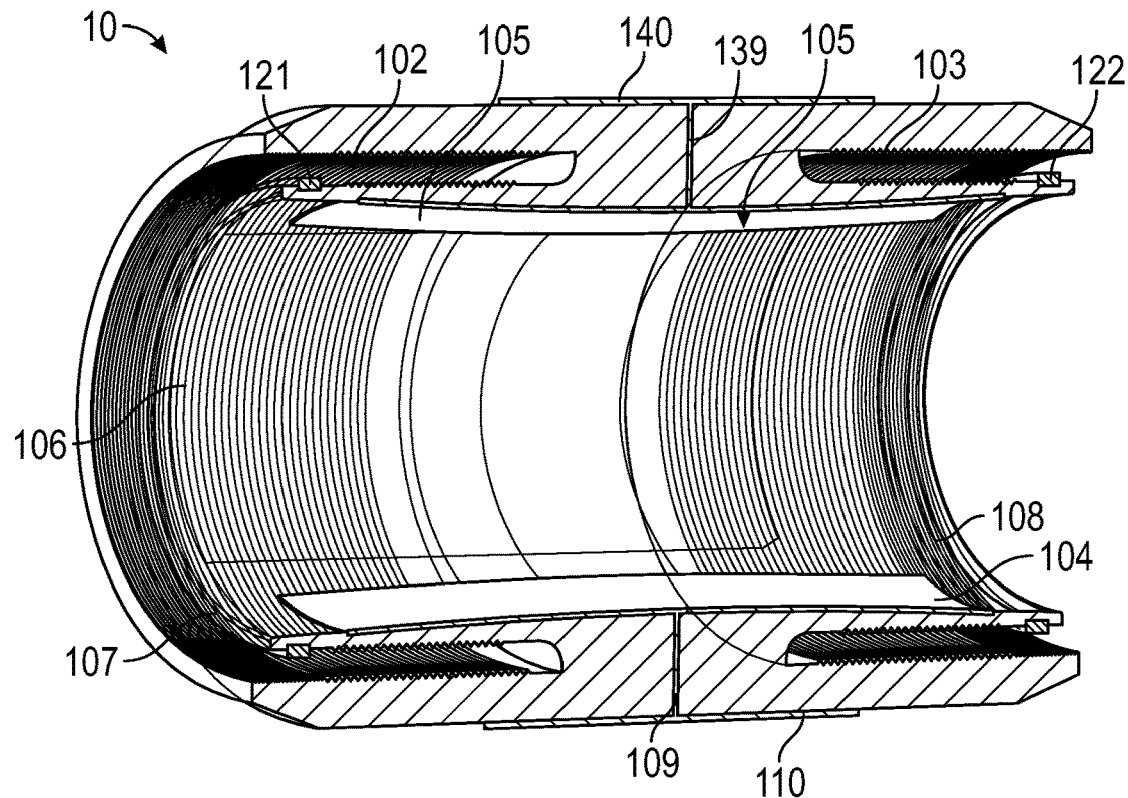

Turning to FIG. 1E, a second cut-away view of MHD connection pump 10 is shown. The second cut-away view of FIG. 1E corresponds to the first cut-away view of FIG. 1D rotated ninety degrees upward.

In some embodiments, the primary material for the body 101, first connection part 102, and second connection part 103 of MHD connection pump 10 is glass reinforced epoxy (GRE). GRE may be manufactured using high strength fiberglass and amine cured epoxy resin processed under a filament winding process to yield a tubular body or pipe. Filament winding is a technique used to fabricate composite materials. In filament winding, a filamentous yarn or tow is first wetted by a resin (such as amine cured epoxy resin) and then uniformly and regularly wound around a rotating mandrel along a predetermined path. Thus, this manufacturing process allows integration, in the bulk of the body of body 101, of copper wires or flat objects, such as sensors or larger objects.

A GRE manufacturing process may be used to produce a variety of bodies exhibiting a variety of thermo-mechanical performance characteristics. Such thermo-mechanical performance characteristics may be defined to withstand temperature increases caused by the activity of an MHD connection pump using a body formed of GRE. Consequently, the integration of the MHD connection pump in a tubing line can help decrease an overall tubing line string. In various embodiments, body 101 of MHD connection pump 10 may be in part metallic. In such embodiments, an insulator is included between cathode electrode 105 and body 101, and/or between anode electrode 104 and body 101.

In some embodiments, anode electrode 104 and cathode electrode 105 are each formed as a metallic, flat insert. This metallic, flat insert may be incorporated into MHD connection pump 10 during the manufacturing of the body 101. Anode electrode 104 and cathode electrode 105 are exposed within inner channel 120, and as such are in contact with a conductive fluid flowing through inner channel 120 of body 101. In other embodiments, anode electrode 104 and cathode electrode 105 are each formed by local deposition of a carbon fiber reinforced tape. In such embodiments, direct contact would be expected between a conductive fluid flowing and the carbon material used to form the electrodes.

In various embodiments, graphene or carbon black may be incorporated into a resin system local to one or both of anode electrode 104 and cathode electrode 105 to improve the electrical conductivity of the epoxy resin. In some cases, a 2.5% carbon black is incorporated in the thermosetting polymer to improve the ultraviolet resistance of the GRE pipe. In other cases, additional carbon black is added (i.e., a 5-7% carbon black) to achieve improvement in electrical conductivity. In other embodiments, other conductive fillers can be used to make it more conductive, such as Graphite powders, Graphene inclusions, Aluminum oxide, Aluminum nitride, Zinc oxide, Boron nitride, or the like. Upon successful even distribution of conductive fillers across the GRE matrix, a low weight fraction of conductive material is needed (from 0.5% to 6% by weight, as a function of inclusion conductivity, morphology and percolation threshold that can drive conductivity despite the absence of physical interconnection of the inclusions. In some embodiments a uniform distribution of conductive filler is developed in the epoxy resin. Additionally, during filament winding processes incorporating carbon fiber reinforced tape as electrode, graphene can be incorporated in the resin system to further improve the electrical conductivity and it will aid in improving direct contact between fluid and carbon material which is important criteria to utilize carbon fiber tape as electrode. Graphene fiber may enhance electrical conductivity due to its high electron mobility. Due to its intrinsic conductivity, graphene fiber can be utilized as efficient and alterative option to transmit electrical signals. Additionally, metallic electrode may face challenges while resisting environmental impact in harsh environment specifically in 40% H2S and high temperature gas applications, and graphene fibers in this environment have been envisioned as an alternative material for electrode.

Figure 2:
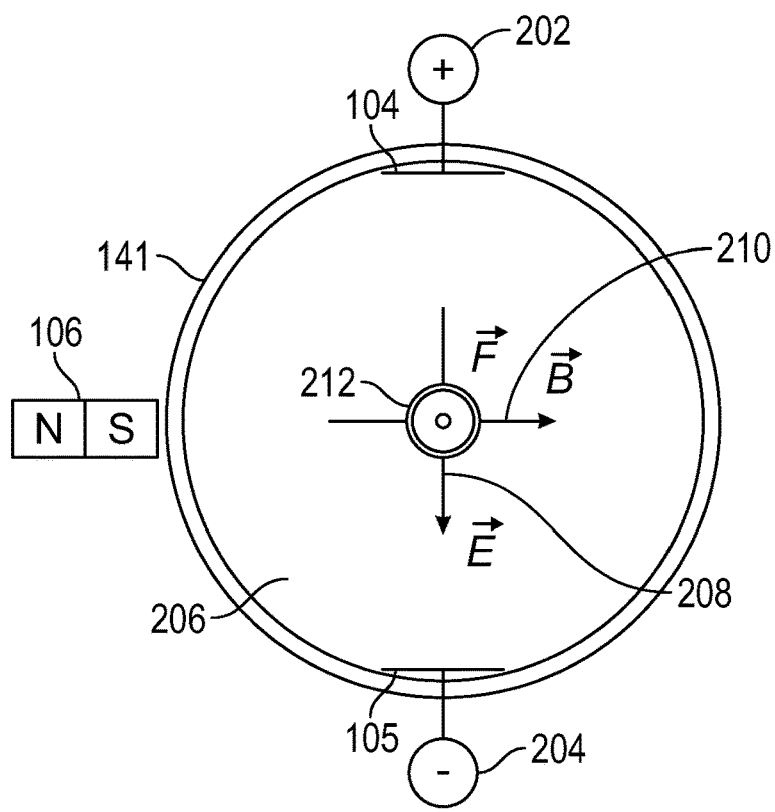
FIG. 2 shows various components of an integrated MHD connection pump generating a net force over a conductive fluid flowing in an inner channel.
Figure 3:
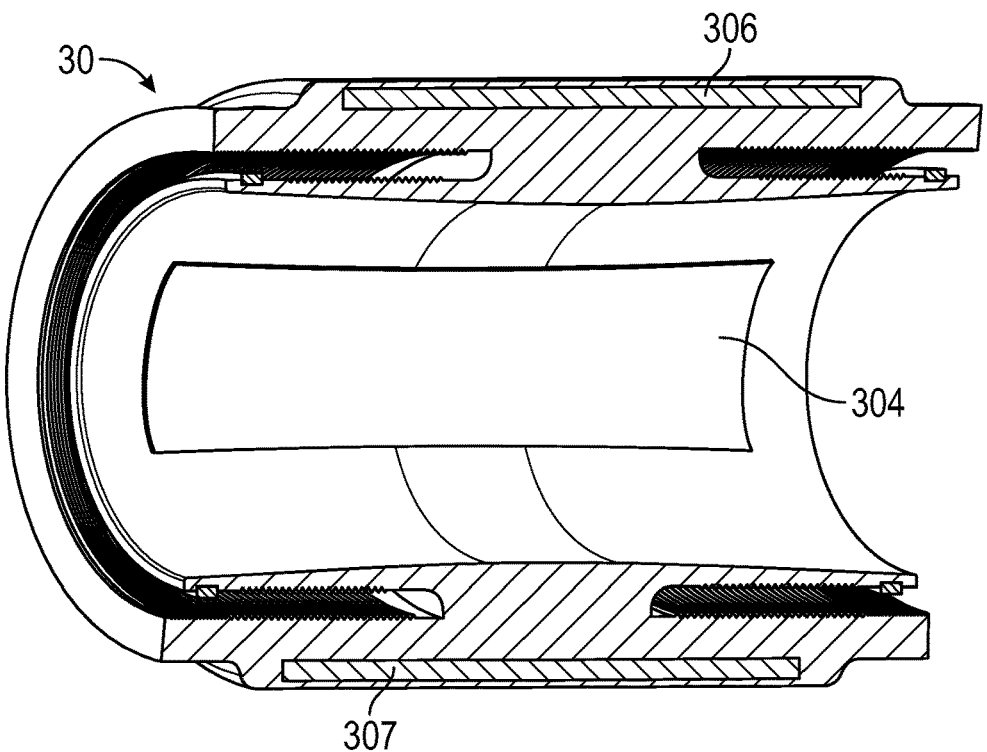
FIG. 3 is a schematic diagram of an MHD connection pump that includes two permanent magnets in accordance with various embodiments.

Turning to FIG. 2, various components of integrated MHD connection pump 10 are shown generating a net force 212 (F) on a conductive fluid 206 flowing through inner channel 120. As shown, when conductive fluid 206 flows through inner channel 120, a positive charge 202 applied to anode electrode 104 and a negative charge applied to cathode electrode 105 maintain an electrostatic field 208 (E) perpendicular to axis direction 145 of body 101. Permanent magnet 106 generates a magnetic field 210 (B) which is also perpendicular to axis direction 145. In this embodiment, magnetic field 210 (B) and electrostatic field 208 (E) are perpendicular to each other. The Lorentz force equation and Ohm's law indicate that the perpendicularity of B and E, as well as their respective intensities drive the net force 212 (F) exerted on conductive fluid 206 along an axis (i.e., a connection axis) perpendicular to axis direction 145.

Again, while the embodiment shown in FIG. 1 includes only one permanent magnet 106, MHD connection pumps in accordance with different embodiments may include more permanent magnets distributed at defined locations along an outside wall of the particular MHD connection pump. As the direction and intensity of the net force discussed above in relation to FIG. 2 is influenced by the strength and relative location of the permanent magnets, an embodiment such as that in FIG. 3 where two permanent magnets (i.e., a permanent magnet 306 and a permanent magnet 307) are disposed on opposite sides of an MHD connection pump 30, exhibit a different net force than the single permanent magnet embodiment of FIGS. 1A-1E. Permanent magnet 306 is located positive ninety (90) degrees from an anode electrode 304, and negative ninety (90) degrees from a cathode electrode (not shown). Permanent magnet 307 is located positive ninety (90) degrees from the cathode electrode, and negative ninety (90) degrees from anode electrode 304.

As suggested in the discussion of FIG. 2 above, the direction and intensity of net force 212 (F) is influenced by the strength and relative location of one or more permanent magnets. FIGS. 4A-4E show various embodiments with different configurations of permanent magnets deployed relative to one another and both an anode electrode 404 and a cathode electrode 405. In FIGS. 4A-4E, fluid flows in an inner channel 420 of body 401 perpendicular to the shown cross-section. For the convenience of description in FIGS. 4A-4E, the position where anode electrode 404 is located on the inside wall of body 401 is defined as a twelve (12) o'clock position and the position where cathode electrode 405 is located on the inside wall of body 401 is defined as a six (6) o'clock position. As is commonly known, a three (3) o'clock position is located about positive ninety (90) degrees (i.e., between eighty (80) degrees and one hundred (100) degrees) from the twelve (12) o'clock position, and a nine (9) o'clock position is located about a negative ninety (90) degrees (i.e., between negative eighty (80) degrees and negative one hundred (100) degrees) from the twelve (12) o'clock position. A one thirty (1:30) o'clock position is located about a positive forty-five (45) degrees (i.e., between thirty-five (35) degrees and fifty-five (55) degrees) from the twelve (12) o'clock position, and a ten thirty (10:30) o'clock position is located about a negative forty-five (45) degrees (i.e., between negative thirty-five (35) degrees and negative fifty-five (55) degrees) from the twelve (12) o'clock position. A four thirty (4:30) o'clock position is located about a negative forty-five (45) degrees (i.e., between negative thirty-five (35) degrees and negative fifty-five (55) degrees) from the six (6) o'clock position, and a seven thirty (7:30) o'clock position is located about a positive forty-five (45) degrees (i.e., between thirty-five (35) degrees and fifty-five (55) degrees) from the six (6) o'clock position.

Figure 4A:
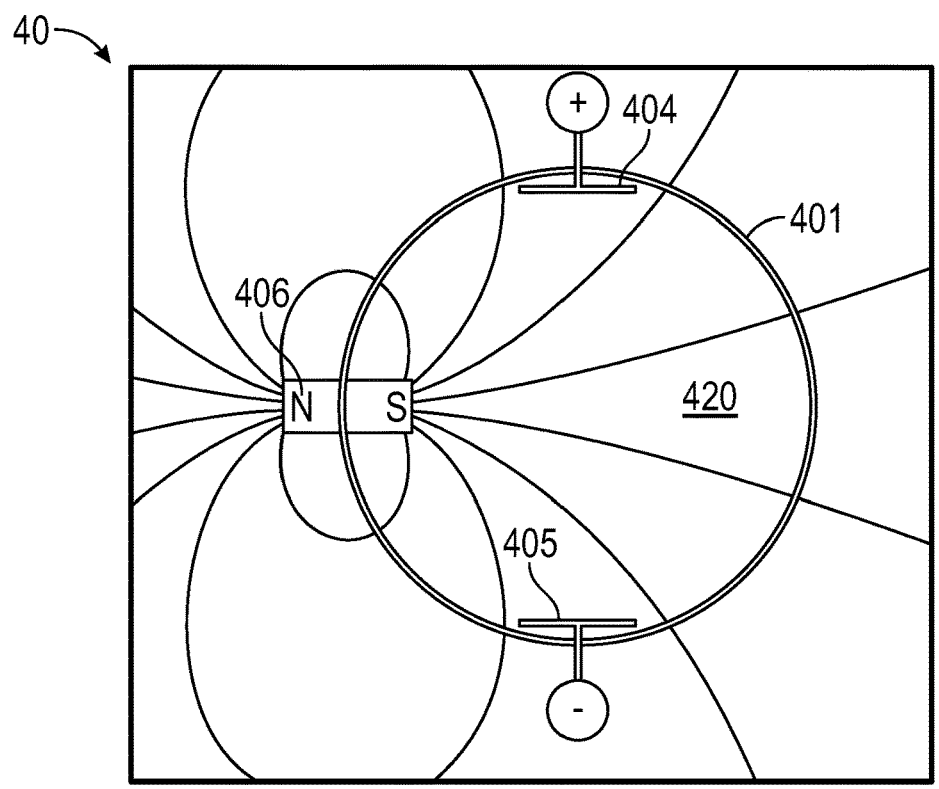
FIGS. 4A-4E are schematic diagrams illustrating the layout of permanent magnets and electrodes relative to a cross-section of an MHD connection pump in accordance with some embodiments.

Turning to FIG. 4A, a cross-section of an MHD connection pump 40 is shown having a single permanent magnet 406 located at a nine (9) o'clock position. MHD connection pump 40 is similar to MHD connection pump 10 discussed above in relation to FIGS. 1A-1E.

Figure 4B:
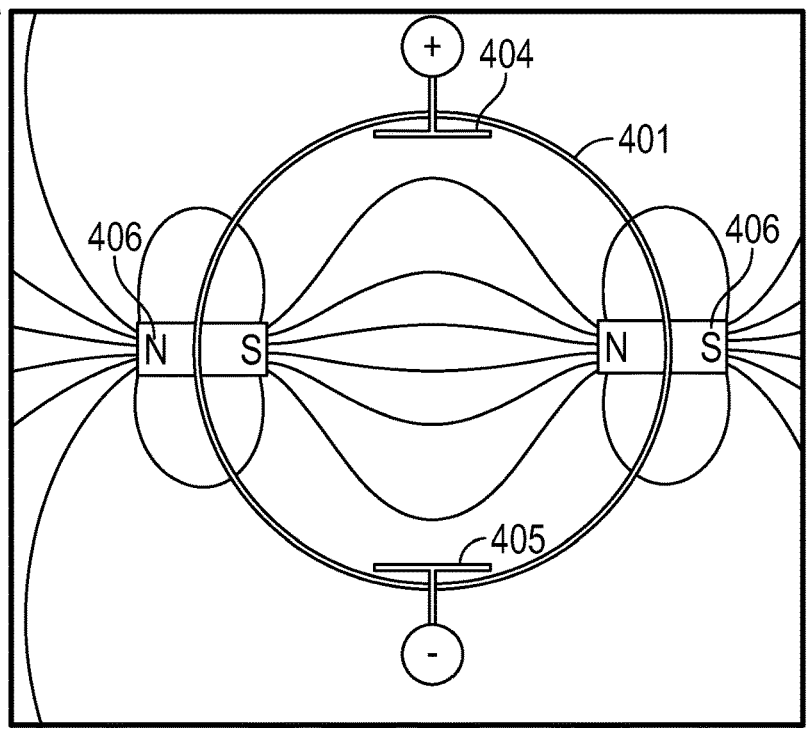

Turning to FIG. 4B, a cross-section of an MHD connection pump 41 is shown having a two permanent magnets 406 located respectively at the nine (9) o'clock position and the three (3) o'clock position. MHD connection pump 41 is similar to MHD connection pump 30 discussed above in relation to FIG. 3.

Figure 4C:
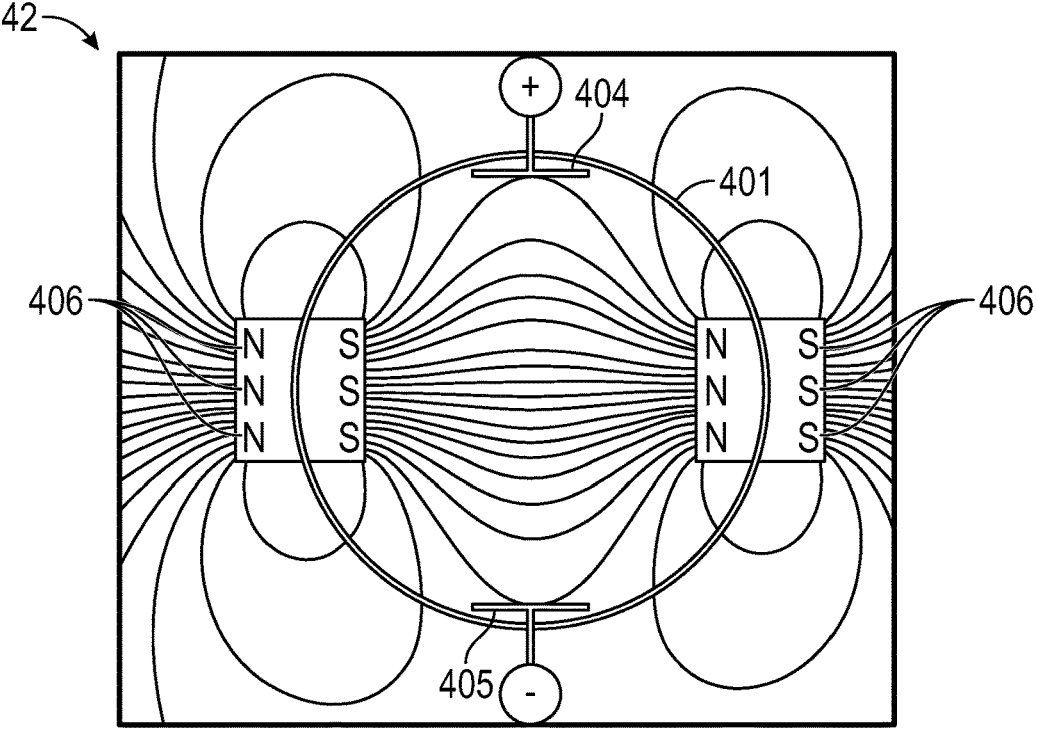

Turning to FIG. 4C, a cross-section of an MHD connection pump 42 is shown having a total of six (6) permanent magnets 406. Three (3) of the six (6) permanent magnets 406 are located at the nine (9) o'clock position and the other three (3) of the six (6) permanent magnets 406 are located at the three (3) o'clock position.

Figure 4D:
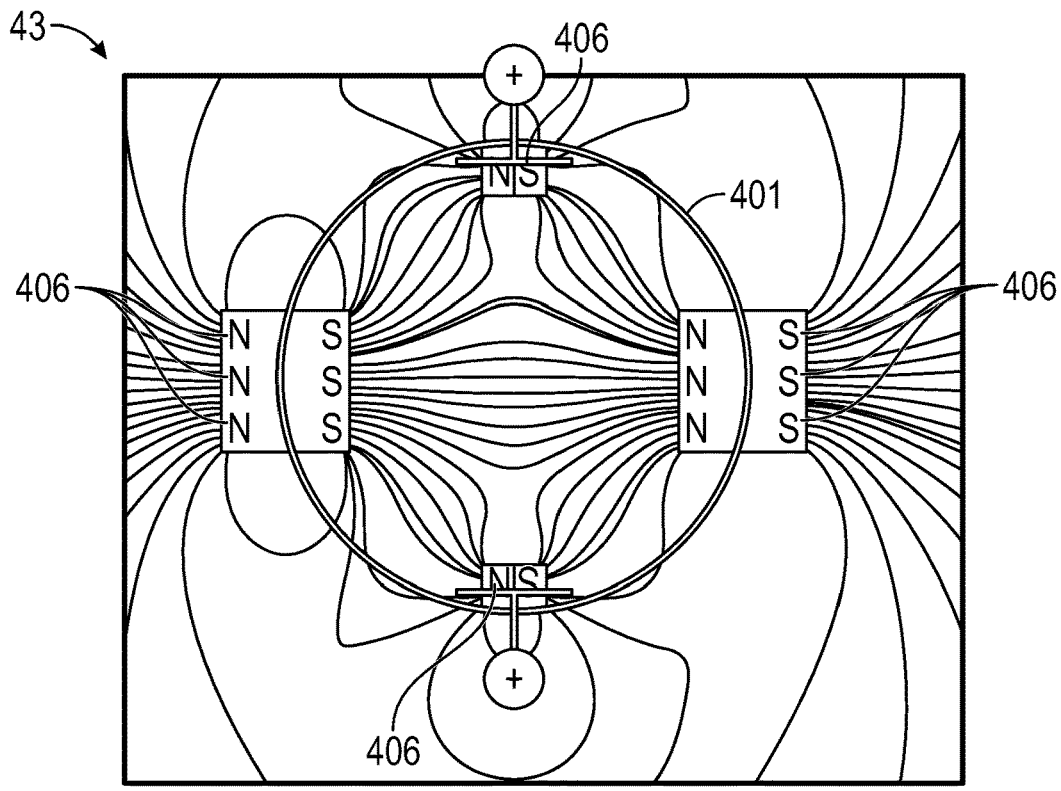

Turning to FIG. 4D, a cross-section of an MHD connection pump 43 is shown having a total of eight (8) permanent magnets 406. Three (3) of the eight (8) permanent magnets 406 are located at the nine (9) o'clock position, three (3) of the eight (8) permanent magnets 406 are located at the three (3) o'clock position, one (1) of the eight (8) permanent magnets 406 is located at the twelve (12) o'clock position, and one (1) of the eight (8) permanent magnets 406 is located at the six (6) o'clock position.

Figure 4E:
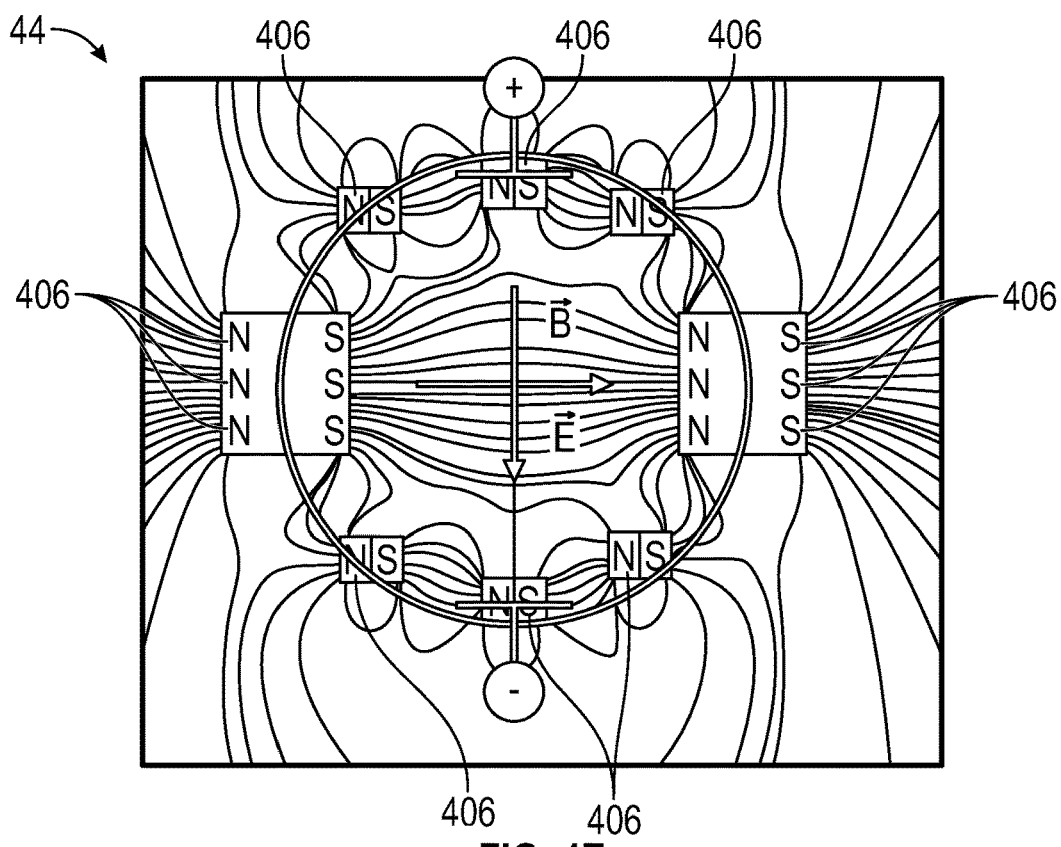

Turning to FIG. 4E, a cross-section of an MHD connection pump 44 is shown having a total of twelve (12) permanent magnets 406. Three (3) of the twelve (12) permanent magnets 406 are located at the nine (9) o'clock position, three (3) of the twelve (12) permanent magnets 406 are located at the three (3) o'clock position, one (1) of the twelve (12) permanent magnets 406 is located at the twelve (12) o'clock position, one (1) of the twelve (12) permanent magnets 406 is located at the six (6) o'clock position, one (1) of the twelve (12) permanent magnets 406 is located at the one thirty (1:30) o'clock position, one (1) of the twelve (12) permanent magnets 406 is located at the four thirty (4:30) o'clock position, one (1) of the twelve (12) permanent magnets 406 is located at the seven thirty (7:30) o'clock position, and one (1) of the twelve (12) permanent magnets 406 is located at the ten thirty (10:30) o'clock position.

For all of FIGS. 4A-4E, there is at least one permanent magnet locates at the nine (9) o'clock position or the three (3) o'clock position on the outside wall of body 401. When there are two or more permanent magnets 406, all of the permanent magnets are located in parallel. In other words, the N poles of all of the permanent magnets are aligned in the same direction.

Figure 5:
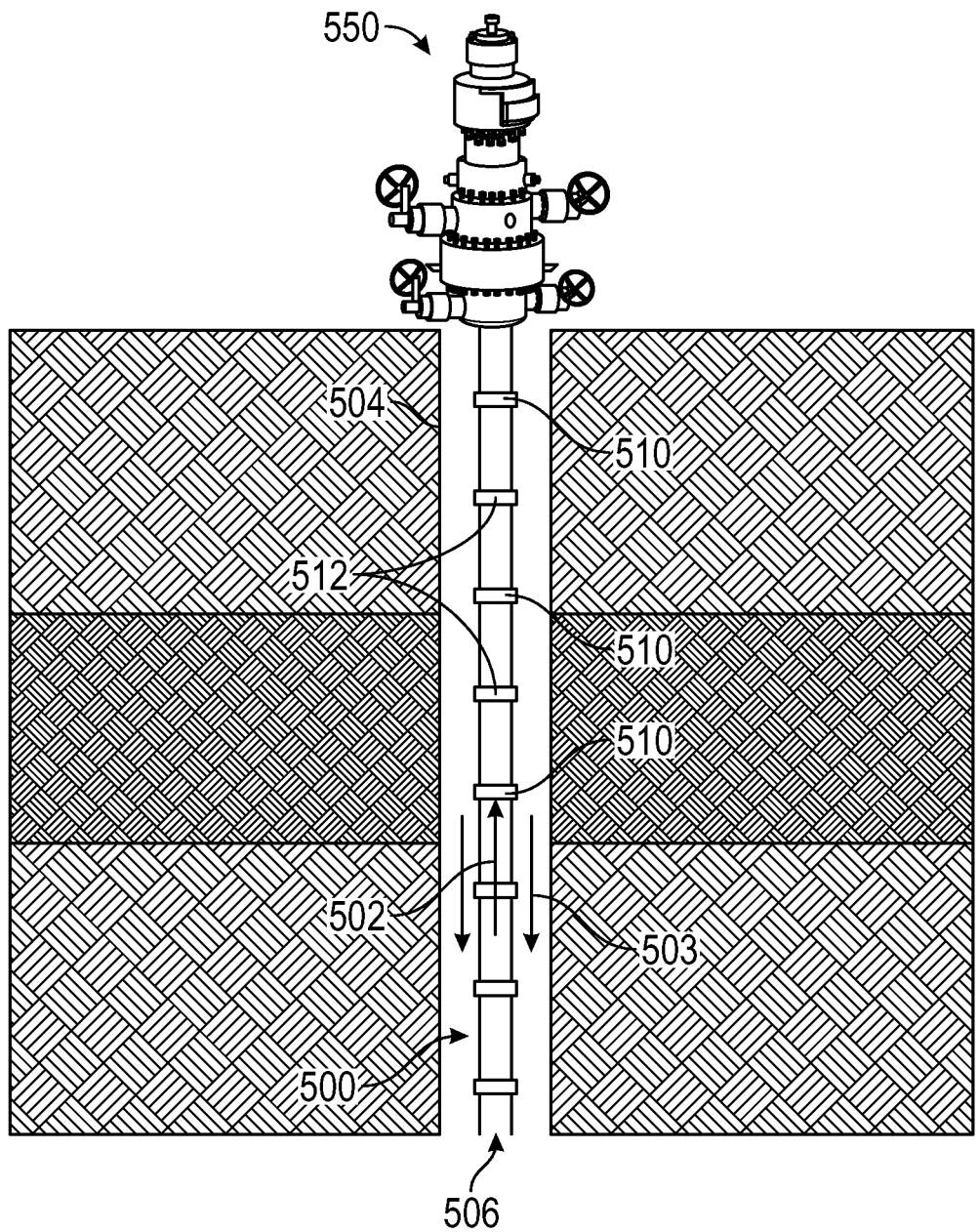
FIG. 5 depicts a downhole tubing connection system using multiple MHD connection pumps in accordance with various embodiments.

Turning to FIG. 5, a downhole tubing connection system 500 using multiple MHD connection pumps 10 is depicted in accordance with various embodiments. Downhole tubing connection system 500 is configured to transport conductive fluids. The flow of the conductive fluids is in a flow direction 502 toward a well head equipment 550. Downhole tubing connection system 500 is connected to a well head equipment 550. Well head equipment 550 may be any pressure-containing component at the surface of an oil well that provides the interface for drilling, completion, and testing of all subsea operation phases. Well head equipment 550 may integrally refer to electric motor, charge pump, pump head and the like to finish the function of oil well that is necessary at the surface of the oil well. Based upon the disclosure provided herein, one of ordinary skill in the art will recognize a variety of well head equipment that may be used in relation to different embodiments.

Downhole tubing line system 500 includes a casing pipe 504 and a tubing line 506. Tubing line 506 is located in casing pipe 504. A fracturing fluid can be injected into casing pipe 504 in a direction 503 from well head equipment 550 and conductive flow can flow through tubing line 506 in flow direction 502 to the surface of the oil well.

Tubing line 506 includes two or more MHD connection pumps 510 and two or more conventional connection pumps 512. Such conventional connection pumps 512 may be, but any convention pumps known in the art including, but not limited to, LSP systems, ESP systems, TP systems, and/or combination of the aforementioned. MHD connection pumps 510 may be any MHD connection pump including, but not limited to, MHD connection pump 10, MHD connection pump 30, MHD connection pump 40, MHD connection pump 41. MHD connection pump 42, MHD connection pump 43, and/or MHD connection pump 44 as described herein.

In some embodiments, MHD connection pumps 510 are evenly distributed with prescribed frequency. In various embodiments, MHD connection pumps 510 are separated by conventional pumps 512. In some instances of the aforementioned embodiments, a first MHD connection pump is located at a first position in a wellbore and a second MHD pump is located at a second position in the wellbore. A first type connection pump is located at a third location in the wellbore, where the first type connection pump is different from the first MHD connection pump and the second MHD connection pump; and a second type connection pump is located at a fourth location in the wellbore, where the second type connection pump is from the first MHD connection pump and the second MHD connection pump. In such instances, the third location may be between the first location and the second location, and the second location may be between the third location and the fourth location. In some such instances, the first type connection pump and the second type connection pump are both intervening conventional pumps 512. Conventional connection pumps 512 may be one type of ESP system, LSP system, TP system, or may include some combination of the aforementioned. In such an embodiment, MHD connection pumps 510 can be considered as a complementary feature to an existing established system and coexist in the well with ESP systems. In some such embodiment, MHD connection pumps 510 provide a back-up solution to the ESP system or to assist ESP systems during operations to minimize the ageing and fatigue of the ESP system.

In one embodiment, algorithms can be developed that are capable of synchronizing the multiple MHD connections to prevent, for example, hammer flow that is detrimental for the durability of equipment, or to impose oscillatory flow regime to prevent from clogging, etc. Such algorithms can potentially be coupled to computational fluid dynamics software to prescribe the functioning mode of the connections in order to obtain the desired result on flow rate, turbulences, etc.

In one embodiment, MHD connection pumps 510 may be employed punctually or clustered at certain locations along the tubing line.

In one embodiment, the downhole tubing line system 500 includes only MHD connection pumps 510 and does not include any conventional connection pumps 512.

In some embodiments, MHD connection pumps 510 can be used to inject fracturing mud from the close sub-surface to in-depth location. Fracturing mud is typically composed of multiple conductive species, and in other cases may lack electrical conductivity to leverage the pumping effect of the MHD connection. Therefore, in one embodiment, the fracturing mud is injected after being compensated by the adding conductive species such as metallic powder, salty water, etc. into the fracturing mud.

In various embodiment, MHD connection pumps 510 are integrated to influence and/or control local speed of the transported hydrocarbons acting as bladeless pump. MHD connection pumps 510 impact the flow speed by accelerating or decelerating the conductive media transported within tubing line 506.

In case of particularly viscous fluids such as fracturing mud, ESP systems can face challenges such as tubing clogging. In a configuration where MHD connection pumps 510 are located at the upstream and/or downstream of the clogging coordinates, the remote activation of one or more of MHD connection pumps 510 may yield a net force over sufficient to unclog tubing line 506. In addition, each of MHD connection pumps 510 can help control the viscosity of the pumped fluids, and replace some heaters usually placed along the tubing line. This is particularly useful where the objective is to lift up heavy crude oil.

While generally discussed in relation to hydrocarbons and fracturing fluids, one of ordinary skill in the art will appreciate that MHD connection pumps as disclosed herein may be applied in other industrial applications involving the flow of electrically conductive fluids.

In some embodiments, integration of a functionality for the safe and efficient flow management of produced hydrocarbons. Some embodiments may provide important additional features. For example, in the previous example of unclogging tubing line 506, a local thermal dissipation effect caused by MHD connections pump 510 located upstream and downstream from the clogging may contribute to decrease local viscosity and help unclogging.

Although only a few example embodiments have been described in detail above, those skilled in the art will readily appreciate that many modifications are possible to the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A magneto-hydrodynamic (MHD) connection pump, comprising:
   a body forming an inner channel,
      wherein the body comprises a first groove and a second groove along an axis direction of the body, and
      wherein each of the first groove and the second groove has an opening in the axis direction of the body;
   a first connection part on a first side of the body;
   a second connection part on a second side of the body
      wherein the first connection part is attached to the first groove, and wherein the second connection part is formed by forming threads in the second groove;
   an anode electrode on an inside wall of the body;
   a cathode electrode located on the inside wall of the body at a location opposite the anode electrode; and
   one or more permanent magnets attached to or embedded into an outside wall of the body.

2. The connection pump according to claim 1,
   wherein the anode electrode and the cathode electrode maintain an electrostatic field perpendicular to an axis direction of the body, and wherein the one or more permanent magnets generate a permanent magnetic field perpendicular to the axis direction, and
   wherein the permanent magnetic field is perpendicular to the electrostatic field.

3. The connection pump according to claim 1,
   wherein each of the anode electrode and the cathode electrode comprises a metallic flat insert, incorporated during a manufacturing process of the body, and
   wherein the anode electrode and the cathode electrode would be in contact with a conductive fluid flowing through the inner channel.

4. The connection pump according to claim 1,
   wherein each of the anode electrode and the cathode electrode are obtained by local deposition of a carbon fiber reinforced tape, and
   wherein each of the anode electrode and the cathode electrode would be in contact with a conductive fluid flowing through the inner channel.

5. The connection pump according to claim 1,
   wherein each of the anode electrode and the cathode electrode are formed by local incorporation of conductive filler such as graphene, carbon black or Boron nitride in a thermoset resin to locally increase electrical conductivity, and
   wherein each of the anode electrode and the cathode electrode are configured to be in contact with a conductive fluid flowing through the inner channel.

6. The connection pump according to claim 1,
   wherein the connection pump further comprises:
      a first conductive wire electrically connecting the anode electrode to a first external electrical cable,
      a second conductive wire electrically connecting the cathode electrode to a second external electrical cable, and
      wherein at least one of the first conductive wire and the second conductive wire comprises one or several filament winded carbon fiber tows or a copper cable inserted during a manufacturing process of the body.

7. The connection pump according to claim 1,
   wherein the anode electrode is located at a 12 o'clock position and the cathode electrode is located at a 6 o'clock position on a cross-section of the body, and
   wherein at least one permanent magnet is located at a 9 o'clock position or a 3 o'clock position on the cross-section of the body.

8. The connection pump according to claim 7, wherein there are two permanent magnets, wherein a first of the two permanent magnets is located at the 9 o'clock position, and wherein a second of the two permanent magnets is located at the 3 o'clock position.

9. The connection pump according to claim 7, wherein there are eight permanent magnets, wherein three of the eight permanent magnets are located at the 9 o'clock position, wherein three the eight permanent magnets are located at the 3 o'clock position, wherein one of the eight permanent magnets is located at the 12 o'clock position, and wherein one of the eight permanent magnets is located at the 6 o'clock position.

10. The connection pump according to claim 7, wherein there are twelve permanent magnets, wherein three of the twelve permanent magnets are located at the 9 o'clock position, wherein three of the twelve permanent magnets are located at the 3 o'clock position, wherein one of the twelve permanent magnets is located at the 12 o'clock position, wherein one of the twelve permanent magnets is located at the 6 o'clock position, wherein one of the twelve permanent magnets is located at a 1:30 o'clock position, wherein one of the twelve permanent magnets is located at a 4:30 o'clock position, wherein one of the twelve permanent magnets is located at a 7:30 o'clock position, and wherein one of the twelve permanent magnets is located at a 10:30 o'clock position.

11. The connection pump according to claim 7, wherein there are two or more permanent magnets, and wherein the two or more permanent magnets are located in parallel.

12. The connection pump according to claim 1, wherein the first connection part and the second connection part are threaded connection parts.

13. The connection pump according to claim 1, wherein the connection pump further comprises a first O-ring located between the first connection part and the first groove, and a second O-ring located in the second groove.

14. The connection pump according to claim 1, wherein the first connection part is a rigid outward tube which can fit with the second groove of another connection pump.

15. The connection pump according to claim 1, wherein the body is formed of glass reinforced epoxy (GRE) by a filament winding process.

16. A downhole tubing connection system, the system comprising:
   a first magneto-hydrodynamic (MHD) connection pump located at a first location in a wellbore, wherein the first MHD connection pump comprising:
      a body forming an inner channel;
      a first connection part on a first side of the body;
      a second connection part on a downstream side of the body;
      an anode electrode on an inside wall of the body;
      a cathode electrode located on the inside wall of the body at a location opposite the anode electrode; and
      one or more permanent magnets attached to or embedded into an outside wall of the body; and a second MHD connection pump located at a second location in the wellbore, wherein the second MHD connection pump comprising:
   a body forming an inner channel;
   a first connection part on a first side of the body;
   a second connection part on a second side of the body;
   an anode electrode on an inside wall of the body;
   a cathode electrode located on the inside wall of the body at a location opposite the anode electrode; and
   one or more permanent magnets attached to or embedded into an outside wall of the body;
a first type connection pump located at a third location in the wellbore, wherein the first type connection pump is different from the first MHD connection pump and the second MHD connection pump;
   a second type connection pump located at a fourth location in the wellbore, wherein the second type connection pump is different from the first MHD connection pump and the second MHD connection pump,
wherein the third location is between the first location and the second location, and
wherein the second location is between the third location and the fourth location.

17. The system according to claim 16, wherein the first MHD connection pump and the second MHD connection pump are acting as bladeless pumps to influence local speed of a transported conductive fluid.

18. The system according to claim 16, wherein the system is configured to inject fracturing mud after adding conductive species into the fracturing mud.

* * * * *